April 25, 1967  C. A. GRAN  3,315,850
DISPOSABLE VALVED SPOUT
Filed April 29, 1965  3 Sheets-Sheet 2
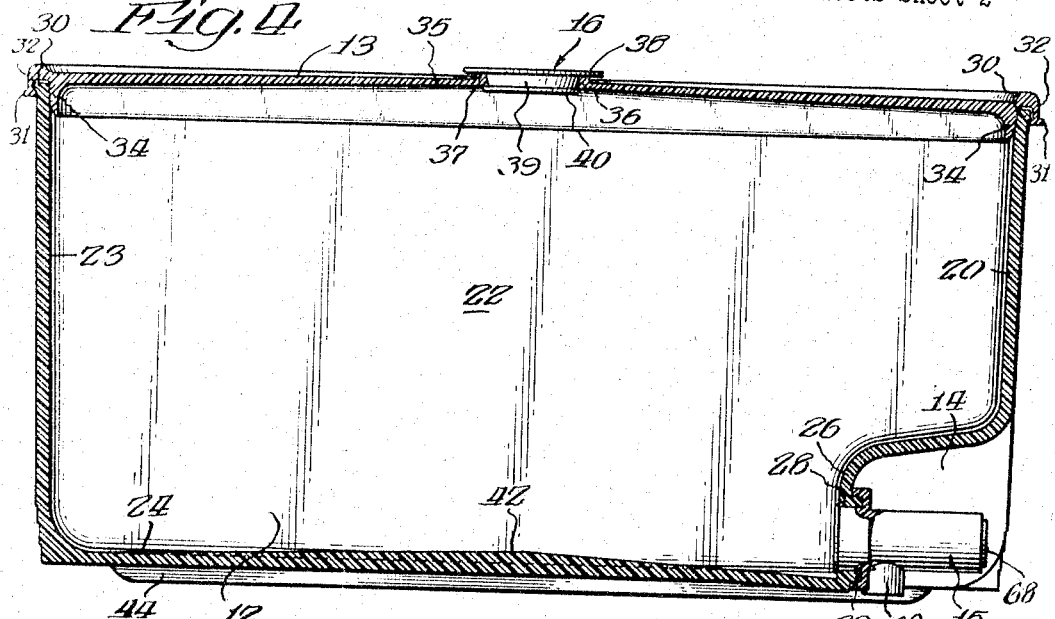
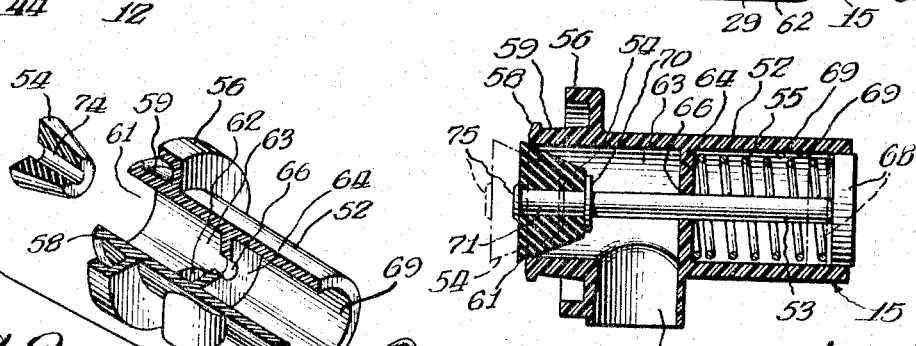
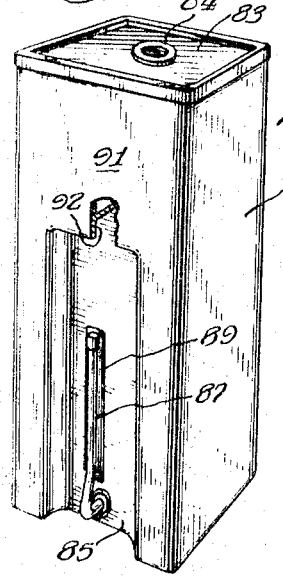
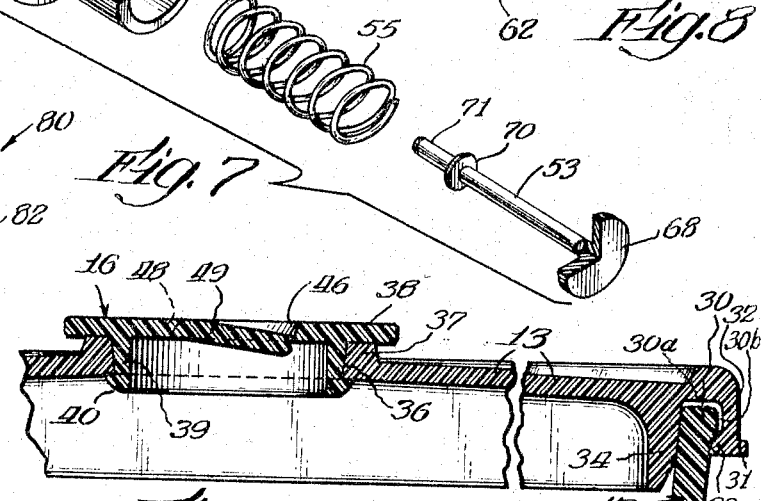
Inventor:
Carl A. Gran
By Bair, Freeman & Molinare Attys.

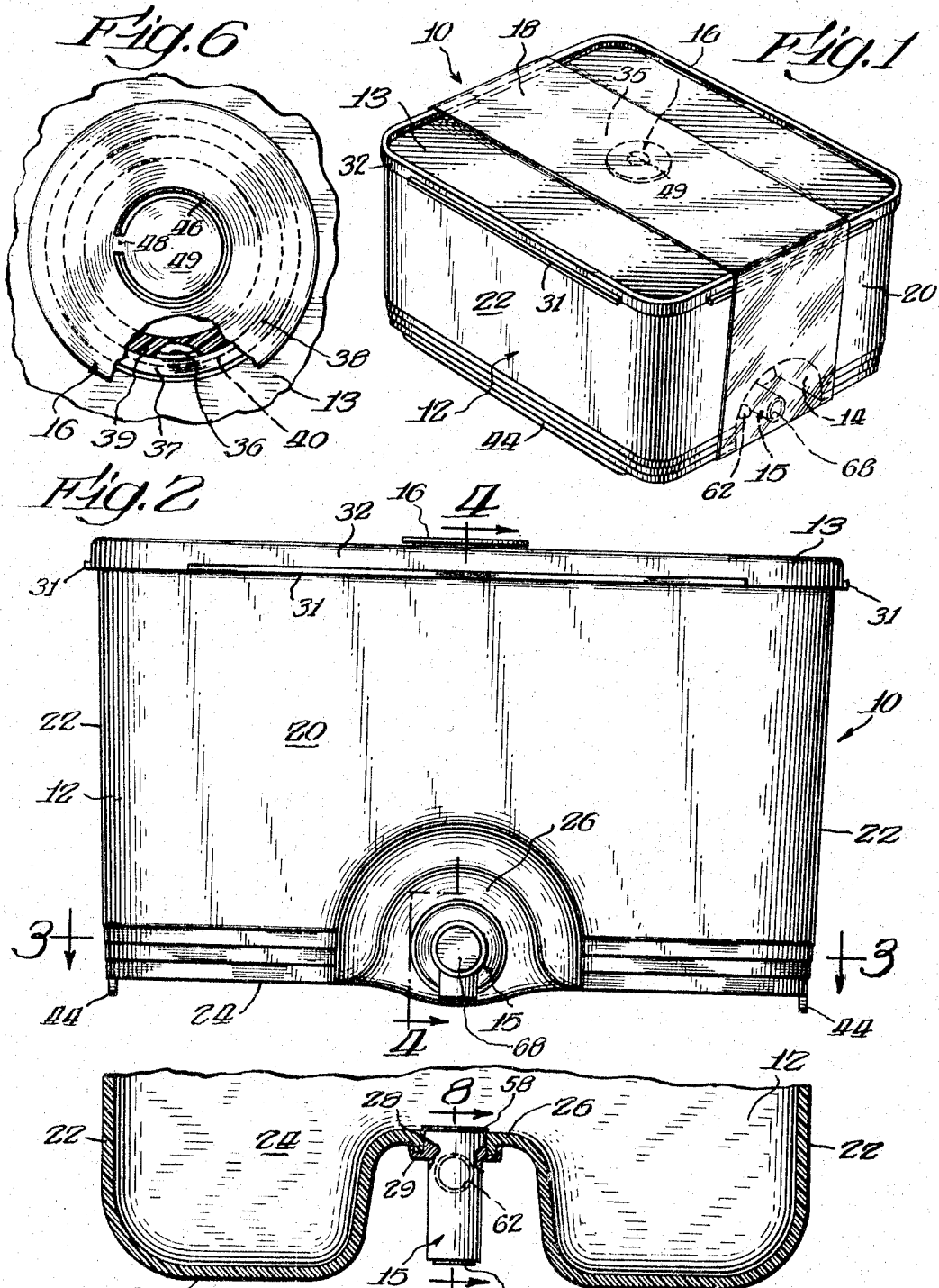

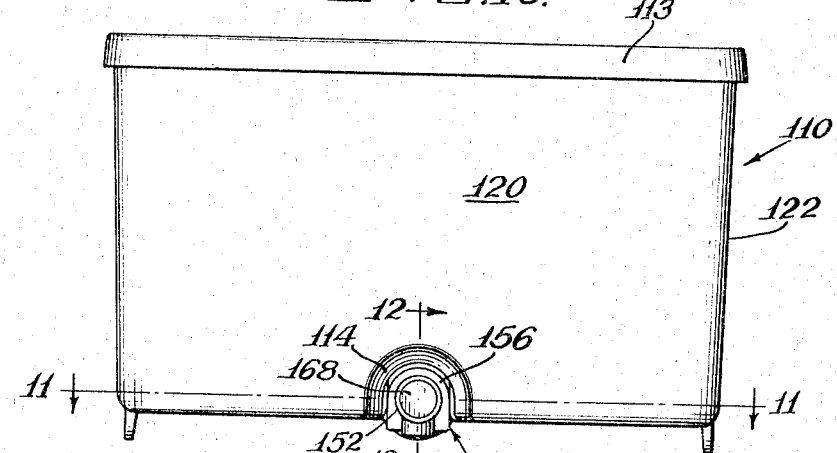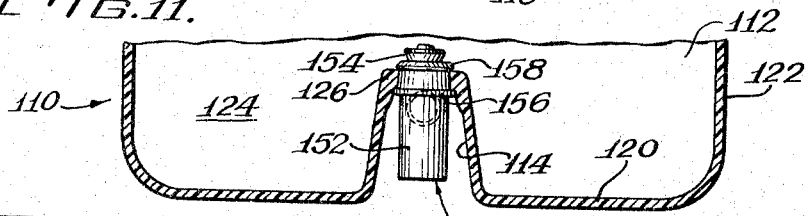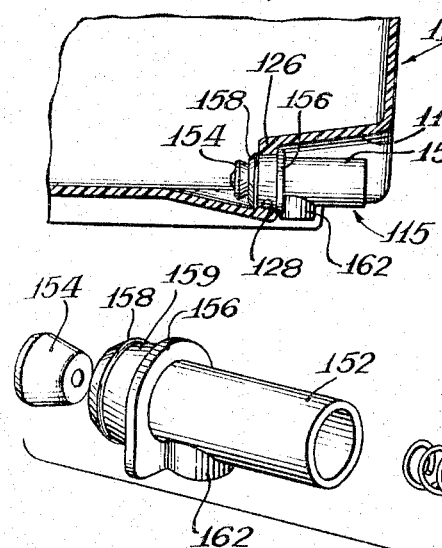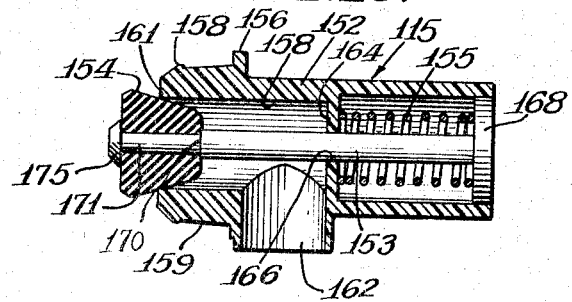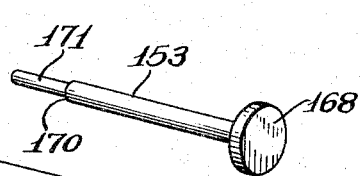

United States Patent Office 3,315,850
Patented Apr. 25, 1967

3,315,850
DISPOSABLE VALVED SPOUT
Carl A. Gran, Arlington Heights, Ill., assignor to Magi-Pak Corporation, a corporation of Delaware
Filed Apr. 29, 1965, Ser. No. 451,751
7 Claims. (Cl. 222—501)

This application is a continuation-in-part of my co-pending application Ser. No. 264,114, filed Mar. 11, 1963, and entitled "Valved Container For Liquid Dispenser," now Patent No. 3,275,146.

This invention relates to dispensing and, more particularly, to a refillable valved container for dispensing liquid comestibles, such as milk, fruit juices, or the like. Further, this invention relates to a refillable container having a disposable valved discharge spout therefor.

Refrigerated dispensers for liquid comestibles, such as milk and fruit juices, have found increasing acceptance in food serving establishments. Ordinarilly, the dispenser has a refrigerated compartment within which a large relatively expensive metal container, as for example, a five gallon milk can, is stored. If made from stainless steel, the initial cost of the container is relatively high. Plated metal cans are less expensive initially but require frequent reconditioning and retinning to maintain requisite health standards. Pinch tube valve means or other valve mechanism is provided to selectively control the discharge of liquid from the container. Because of the bulky size and configuration of the conventional milk container, handling and storage thereof is difficult. During the off season, much warehouse space is taken up with these containers, which are not nestable one within another.

Thus, a primary object of the present invention is to provide an improved container for milk or like liquid comestible which is inexpensive to make, which is reusable and has long life, and which can be nested one within another to minimize storage space requirements.

The invention is particularly adapted for use as a milk dispenser both in the home and in food serving establishments, such as restaurants. Accordingly, the container must be easily handled when filled with milk. Because of the fact that milk provides a medium highly susceptible to the growth of microorganisms, the parts which contact the milk must be capable of complete cleaning.

Another object of the invention is to provide a container having a low ratio of weight to volume and a geometric configuration which lends itself to easy handling and thus to use in the home, as well as in commercial food serving establishments.

A further object of the present invention is to provide a molded plastic container having a molded plastic cover sealingly and detachably engaged with the sides thereof, such container being easily cleaned and handled.

Still another object of this invention is to provide a refillable molded plastic container having an inexpensive disposable valved discharge spout for controlling the discharge of liquid from the container, the discharge spout being detachably connected to the container so as to facilitate cleaning thereof and being protectively enclosed by a recessed wall of the container to protect the discharge spout during transport and handling.

Yet another object of this invention is to provide an inexpensive disposable valved spout for controlling the discharge of liquid from a refillable molded plastic container, such valved spout being adapted for snap-on attachment to the container and consisting of four elements—a housing, a valve stem with actuator head, a resilient valve member, and a bias spring for urging the valve member to closed position.

These and other objects and advantages of this invention will be readily perceived from the following description.

These novel features and the novel structural components and their mode of functioning will be made most manifest and particularly pointed out in clear, concise and exact terms in conjunction with the accompanying drawings, wherein:

FIGURE 1 is a perspective view of a refillable valved container of the present invention illustrating a protective shipping band around the container;

FIGURE 2 is a front elevational view on an enlarged scale of the refillable valved container of FIGURE 1;

FIGURE 3 is a fragmentary cross-sectional view of the refillable valved container taken generally along the line 3—3 of FIGURE 2;

FIGURE 4 is a longitudinal cross-sectional view of the refillable valved container taken generally along the line 4—4 of FIGURE 2;

FIGURE 5 is a fragmentary cross-sectional view of the container on an enlarged scale illustrating the assembly of the cover to the sides of the container and the assembly of the closure plug to the cover;

FIGURE 6 is a fragmentary plan view on an enlarged scale of a portion of the cover of the container and the closure plug secured thereto;

FIGURE 7 is an exploded perspective view of one form of the novel discharge valve member for controlling the flow of liquid from the container;

FIGURE 8 is a cross-sectional view of the form of the novel discharge valve member of FIGURE 7 and is taken generally along the line 8—8 of FIGURE 3;

FIGURE 9 is a perspective view on a reduced scale of a modified container embodying the principles of the preferred embodiment relative to the container construction per se but having pinch-tube discharge means;

FIGURES 10-14 are directed to another form of valved container and disposable valved spout therefor, embodying the principles of the invention herein, and wherein FIGURE 10 is a front elevational view of the modified form of construction;

FIGURE 11 is a fragmentary cross-sectional view taken generally along the line 11—11 of FIGURE 10;

FIGURE 12 is a fragmentary cross-sectional view taken generally along the line 12—12 of FIGURE 10;

FIGURE 13 is a cross-sectional view of the improved disposable valved spout; and FIGURE 14 is an exploded perspective view of the improved disposable valved spout.

Referring now more particularly to the drawings, like numerals in the various figures will be employed to designate like parts.

As best seen in FIGURE 1, the dispenser or refillable valved container 10 of the present invention comprises an open-topped, box-like receptacle 12 having a cover 13 sealingly engaging the top edges of the receptacle and a discharge valve member or spout 15 detachably engaged in a recessed wall indicated generally at 14 in the front of the receptacle 12. After the container has been filled with milk or suitable liquid comestible, the inlet opening in the cover 13 is closed by means of a closure plug 16.

To facilitate handling and shipment and to protect the discharge valve member 15 which is constructed and arranged to be confined within the recess in the front wall of the receptacle, a wrap-around protective cover 18 made from a suitable plastic, as for example, polyethylene, is provided.

Considering now FIGURES 2, 3 and 4, there is shown more clearly the receptacle or container of the present invention. Preferably, the receptacle is molded from plastic, as for example, polypropylene, and includes integrally formed front wall 20, side walls 22, rear wall 23 and bottom 24. The walls taper upwardly from the bottom so as to facilitate nesting of the receptacles 12 when the receptacles are to be stored.

The front wall 20 of the receptacle 12 includes a recessed wall portion 26. Provided in the recessed wall portion 26 is the discharge opening 28. An annular flange or rim 29 extending outwardly from wall 26 is defined about the discharge opening 28. The valved spout 15 is adapted to be sealingly engaged within the discharge opening 28 in a manner more clearly described later.

Annular rim means 30 are integrally formed on the sides of the receptacle adjacent the upper edges. A feature of the present invention is the novel cooperation between the interengaging portions on the cover 13 and the lip or rim 30 defined on the upper edges of the walls 20, 22 and 23 which results in a tight seal that will maintain tight even through extended use.

The cover member 13 has a generally L-shaped depending marginal flange 32 formed thereon abutting the outside of the rim 30 on the walls 20, 22 and 23, respectively. As seen most clearly in FIGURE 5, adjacent the bottom and extending inwardly on the annular flange 32, there is provided a bead 33 adapted to cooperate with the lower exterior corner on the rim 30.

Formed on the outside of the flange 32 are rims 31 for reinforcing the sides of the cover and for permitting easier gripping of cover 13 when it is desired to remove the cover from the receptacle. To form an improved seal, the rim 30 is spaced from the flange 32 along two sides as indicated at 30a and 30b. Depending downwardly from the cover 13 in spaced relation with the flange 32, is a depending flange 34, which has a surface mating with and being closely engaged with the tapered surface on the inner wall of the sides. The mating surfaces are about one-half inch wide. It is preferred that the taper on the surfaces of the engaging members be about five degrees with respect to the plane of the wall. The novel cooperation of the cover with respect to the walls of the receptacle assures the formation of a hygienic sealed compartment within the container.

Within the central portion 35 of the cover 13, there is provided a fill or inlet opening 36. After the container has been filled with the liquid, the closure plug 16 is inserted into the opening 36 to seal the compartment.

The closure plug or cap 16 comprises a generally planar top or sealing head 38, a central annular portion 39 integrally formed on the sealing head 38, and an annular bead 40 of slightly larger diameter than the minimum diameter of the fill opening 36 formed on the extremity of the central annular portion 39. The closure plug 16, preferably formed from a softer plastic than the container, as for example, polyethylene, is forced through the opening 36 until the rim 40 engages the underside of the material defining the opening. The periphery of the central annular portion 39 engages the annular raised wall 37 on the exterior of the cover and the rim 40 of the closure plug or cap 16 engages the inner wall of the cover 13 so as to provide a tight engagement between the closure plug and the cover. The tightness of the seal between the two parts is further assured by virtue of the cooperating taper between the sides of the annular portion 39 and the portion of the cover 13 defining the opening 36, which taper is preferably on the order of five degrees.

As is evident from FIGURE 4, the central portion 35 of the cover 13 is raised with respect to the ends of the cover. By virtue of this construction, an oil-can type of operation of the cover with respect to the receptacle is provided. This is necessary to facilitate removal of the cover from the receptacle when it is desired to clean the container after use, inasmuch as the seal provided between the flanges on the extremities of the cover and the upper edges of the walls of the container is of a high quality.

To assure that substantially all of the liquid contained within the container is drained from the container 12 during use, the center of the bottom 24 of the container is raised as indicated generally at 42, then slopes toward discharge opening 28, where a sump is provided.

The bottom of the container may be provided with legs 44, which are adapted to be positioned adjacent flanges 30 on a cover when one filled container is stacked atop another. Further, the legs space the bottom of a container 10 from a shelf or another container so as to permit the circulation of air entirely about the container 10, when it is stored in a refrigerated compartment of a dispenser. Circulation of cool air about the container will result in maintenance of a relatively constant and uniform temperature of the liquid within the container.

Considering specifically FIGURES 5 and 6, there is illustrated in enlarged scale the connection of the cover to the sides of the container and the connection of the closure plug to the cover 13. It will be noted that the disposable closure plug 16 has defined in the central portion thereof a scoring 46 generally circular in configuration. The scoring 46 is discontinuous so as to provide unscored portion 48, which is adapted to retain the cut-out portion 49 after puncturing of the cut-out portion 49 along the scoring 46. In use, the container is filled with liquid comestible through the fill opening 36 defined in the cover 13. Then the closure plug 16 is inserted into the opening to seal the container. After delivery and prior to use, the consumer can press downwardly upon the cut-out portion 49, causing the scoring 46 to break and the cut-out portion to move downwardly as indicated in FIGURE 5, thus permitting air to enter the container as milk is withdrawn therefrom.

If desired, cover 13 can be integrally molded without fill opening 36, thus eliminating closure cap 16. Permanent vent means may be provided in the cover for venting the interior of the container. Such vent means may comprise a labyrinth-type passageway defined in flange 32 and extending in three sides of the flange along about 180 degrees. The passageway, which is an extension of the chamber defined between the exterior of rim 30 and the interior of flange 32, communicates at one end to the atmosphere by means of a notch in flange 32 of cover 13 and communicates at the other end to the interior of the container by means of a notch in flange 34 of cover 13.

Turning now to a consideration of the disposable snap-in discharge valve member 15 which forms a part of the present invention, it will be seen that the valve member consists of four components: a housing 52, a valve stem 53, a valve 54 and a bias spring 55 for biasing the valve to the closed position.

Formed on the molded tubular housing 52 adjacent the connection to the container 12 is an annular flange 56 generally L-shaped in cross section. The annular flange 56 is adapted to cooperate with the outwardly extending annular flange or rim 29 on the container. Adjacent the end of the housing 52 and spaced from the annular flange 56, there is provided a deformable bead 58, which is of a slightly larger diameter than the minimum diameter of discharge opening 28. The surface 59 of the housing defined between the annular flange 56 and the bead or rim 58 on the housing 52 tapers generally toward the discharge opening or end of the housing at an angle of about five degrees.

As best seen in FIGURE 3, the bead 58 is adapted to be inserted through the discharge opening 28 and to engage the inner surface of the recessed wall 26. The annular flange 56 will engage the annular flange or rim 29 provided about the discharge opening and in this manner the discharge valve member 15 is sealingly and detachably engaged to the container 12. The taper on the annular portion 59 corresponds to the taper on the wall of the container defining the discharge opening 28 so that the two surfaces sealingly engage one another.

The elongated housing 52, which is preferably cylindrical, is open at each end and has a side opening defined intermediate the ends thereof. The housing 52 is preferably made from a softer plastic than the container so as to minimize wear about the discharge opening 28, as it is intended that the container will be used many times, whereas the snap-in valved spout will be used only once and then discarded. A valve seat 61 is defined within one end of housing 52. The housing 52 includes a transverse, radially extending outlet opening 62 which communicates with the inlet opening via a passageway 63 through the housing, a portion of the passageway 63 being defined by a transverse wall 64 in the housing 52. The transverse wall 64 thus, in part, partially bounds two spaced open-ended chambers defined in housing 52, with the first chamber arranged to have liquid flow therethrough for discharge through outlet opening 62.

Disposed in housing 52 and slidingly engaged within a small opening 66 located centrally in the transverse wall 64 is the elongated valve stem 53. The stem 53 is of plastic material and cooperates with the transverse wall 64 which defines the edges of bore 66 to serve as a seal means for inhibiting leakage of liquid through bore 66. Formed on the end of the valve stem remote from the inlet opening is a head 68, which conforms generally to the internal configuration of the housing and is adapted to slide in the bore, or second chamber, 69 of the housing 52. The stem 53 includes a flange or abutment shoulder 70 defined at the intersection of the reduced diameter end part 71 and the relatively larger stem portion. The end 71 of stem 53 extends through bore 74 in valve 54 and carries the valve thereon, with the bottom of valve 54 engaging flange 70. The tip of stem 53 is heated and upset to form plug end 75 for retaining valve 54 on stem 53. The valve stem 53 is preferably molded from the same material as the container 12 and the valve plug 54 is preferably made from a relatively soft plastic, rubber or like material. These materials must be inert so as to impart no objectionable taste or smell to the liquid comestible with which it comes into contact. The bias spring 55, which is adapted to seat the valve against the valve seat 51, is positioned in the second chamber of housing 52 between the transverse wall 64 in the housing and the head 68 on the valve stem 53.

An important feature of the valve construction is that the valve head 68 is slightly out of round with respect to the bore 69 in the valve housing 52. This permits free air movement between the compartment defined within the housing and the exterior thereof so as to permit free movement of the valve stem 53. The creation of a pressure block which would tend to interfere with movement of the valve stem is obviated.

When the liquid is to be discharged from the container, the valve stem 53 may be actuated to the left as viewed in FIGURE 8 by pressing against the head 68 sufficient to overcome the spring force biasing the valve closed. The valve 54, which as shown is of frusto-conical shape with a portion thereof of smaller dimension than valve seat 61 and another portion thereof of greater dimension than valve seat 61, is then displaced away from the valve seat 61 and liquid may pass through the passageway 63 and flow from the valve member 15 through the discharge opening 62. Upon release of the force urging the valve stem 53 to the left, the spring 55 will bias the valve stem to the right against valve seat 61, thus closing the valve and preventing discharge of liquid from within the container.

Referring now to FIGURE 9, there is illustrated a modified dispenser or container of the present invention. The modified container 80 comprises a receptacle 82 and a cover 83 sealingly engaged therewith in the same manner as the cover of the preferred embodiment of the invention. The cover 83 has an opening therein closed by a closure plug 84, which is the same as the closure plug defined in the preferred embodiment of the invention. The front wall of the receptacle 82 is recessed as indicated generally at 85. The discharge opening is provided in the recessed wall. A valve of the present invention may be utilized in the discharge opening, or the discharge opening may be provided with a pinch-tube discharge means indicated at 87. Forwardly extending flanges 89 are provided on the recessed wall 85 to engage the pinch tube and retain it in position on the front wall during shipment of the dispenser package 80.

As indicated by the break-away portion of the illustration, the front wall 91 depends downwardly over the recess defined in the front wall so as to provide a handle 92 on the wall to aid handling of the container. The rear wall of the container may be similarly recessed so as to provide a pair of handle means to facilitate handling and lifting of the container. The container illustrated will typically be utilized for seven gallons of liquid comestible.

Referring to FIGURES 10, 11 and 12, there is illustrated a modified dispenser 110. The dispenser 110 comprises an open-topped, box-like receptacle having a cover 113 sealingly engaging the top edges of the receptacle and a disposable valved spout 115 detachably engaged in a recessed wall 114 in the front wall 120 of the receptacle. Although not shown, it will be understood that covered receptacle 110 with disposable valved spout 115 attached thereto is adapted to receive a wrap-around protective cover similar to cover 18 described hereinabove. In the improved form of the invention, the innermost end of recess 114 that is adjacent the wall 126 is of a specific cross section, and as shown, includes a semicircular upper portion which merges into a pair of spaced parallel upright sides.

The disposable valved spout 115, which is adapted for snap-in engagement with the opening defined in the rearmost portion 126 of the recessed wall 114, is provided with an aligning flange 156 which is specifically shaped to provide a top portion that is generally semicircular in configuration as viewed from the front, and whose bottom portion will not register with the semicircular upper portion at the inner end of recess 114. The configuration of said top portion of flange 156 is complementary to the configuration of the surface defining recess 114, with the sides of the top portion engaging with the adjacent surfaces of recess 114 (FIGURE 11). This construction requires a precise aligning of the disposable valved spout 115 within the recess 114 prior to the spout being snapped into the opening 128 in the dispenser 110.

In general, the disposable valved spout 115 corresponds to the spout 15. Referring to FIGURES 13 and 14, the disposable snap-in valved member 115 consists of four components: a housing 152, a valve stem 153, a valve 154, and a bias spring 155 for biasing the valve to the closed position.

The housing 152 comprises an elongated hollow part formed from plastic material and defining a transverse wall 164 between its ends. The transverse wall 164, which defines first and second open-ended chambers within the housing 152, is provided with a central slide opening 166 therein.

The housing 152 is shaped to include a depending cylindrical discharge spout 162 which communicates with the first of the two chambers. A valve seat 161 is defined at the end of the housing 152 bounding the first chamber. An annular inner abutment bead 158 is formed on the exterior of housing 152 adjacent the valve-seat end of the housing. The rearwardly tapering surface 159 between the abutment means 156 and 159 corresponds with the tapered surface in wall portion 126 which defines opening 128.

The valve stem 153 comprises a central elongated rod-like member having an enlarged head 168 affixed to one end thereof and having a reduced elongated portion 171 formed at the other end thereof. The head 168 is substantially complementary to the cylindrical interior of housing 152 but is slightly out of round so as to avoid trapping air between the head 168 on stem 153 and the transverse wall 164. The intersection of the enlarged central rod-like portion with the reduced rod-like portion 71 defines an abutment shoulder 170 against which the valve 154 is adapted to abut.

In assembly, the spring 155 is positioned on the stem 153 in abutment with the head 168. The stem 153 is inserted through opening 166 in the transverse wall 164 of the housing 52. The general frusto-conical valve 54 may be slipped over the reduced portion 171 on the valve stem 53 until it engages with the shoulder 170 on the valve stem. The end of the valve stem is then heat upset as indicated at 175 in FIGURE 13 to operatively connect the valve to the valve stem and to thus complete the assembly of the four-piece valved spout unit.

For use, the valve-seat end of housing 152 of the disposable spout unit 115 is inserted through opening 128. The annular bead 158 is adapted to engage the interior of the front wall 120 of receptacle 112 and the flange or abutment means 156 is adapted to engage the exterior surface of front wall 120. The exterior surface portion 159 of housing 152 tapers toward the valve-seat end of housing 152 and engages with a similarly tapered surface in wall 120 which defines opening 128. The abutment bead 158 and the flange 156 are spaced apart a distance equal to the thickness of wall 126 defining opening 128. By this arrangement, the housing 152 is engaged securely within opening 128 with a snap-fit for use and the valved spout 115 can be removed from the opening to permit complete cleaning of the container 110.

The valved spout 115 is inexpensive and can be disposed of after a single use.

The containers preferably are formed of a readily molded and easily cleaned plastic, such as polypropylene, and can be made in a variety of forms, but preferably are generally rectangular as indicated in the drawing. The improved containers have excellent impact absorption and resistance to dents, thus promoting longevity in use. Another advantage of the container of the present invention over comparable metal containers is that it has a lower tare weight in relation to capacity. The containers have covers which are sealingly engaged with the sides of the container to provide a hygeinic sealed compartment therewithin. These covers are removable for ease of cleaning and usable over extended periods without loss of sealing efficiency. The containers are so designed that with the covers removed, they are nestable one within another to conserve space while in storage. Further, the interior surfaces will release dried milk products and other contaminants easier than metal surfaces and are easily visible for inspection for cleanliness.

The geometric configuration of the container is compatible with present automatic filling equipment and automatic washing equipment utilized by the dairies, and lends itself to easy handling in the home or in a commercial food serving establishment, such as a restaurant or cafeteria.

Use of an inexpensive plastic snap-in valved discharge spout for controlling the discharge of liquid from the container, which spout is disposable after use, facilitates cleaning of the container. By recessing the discharge outlet in a wall of the container and confining the valved discharge spout within said recess, protection is provided for the discharge spout during the transport of the filled container.

Substantial economy is effected by the modest initial cost of the reusable container and by the greatly reduced cost of packaging of the novel container as compared with either reusable metal cans, or single service wax or poly-coated cartons.

While there has been shown and described a particular embodiment of this invention, it will be obvious to those skilled in the art that various changes and modifications may be made therein without departing from the invention and therefore, it is intended in the appended claims to cover all such changes and modifications as fall within the true spirit and scope of the invention.

I claim:
1. A disposable valved spout for a liquid dispenser consisting of four elements: a tubular housing; a valve stem; a valve; and a spring; said housing being open at each end and having a side opening in a wall of said housing intermediate the ends thereof, said housing having a transverse wall between one end of said housing and said side opening, there being defined within said housing two spaced open ended chambers, one chamber being generally circular in cross section, said transverse wall having a circular bore therethrough, said valve stem being cylindrical and having a peripheral configuration complementary to said circular bore and extending through and being slidingly engaged in said bore so as to inhibit leakage between the two chambers around the stem and through the bore, said valve stem having a transverse member on one end thereof, said transverse member having a peripheral configuration substantially complementary to the circular interior of said one chamber in said tubular housing, but being slightly out of round, whereby said transverse member is slidable in said one chamber in the housing and the trapping of air between said transverse member and said transverse wall is prevented, said valve being affixed on the other end of said valve stem and being adapted to engage a valve seat defined adjacent the other end of said housing, said spring being a coil spring constructed and arranged to bias said valve to the closed position against said valve seat.

2. A disposable valved spout for snap-on attachment to a container for liquids, said valved spout consisting of four elements: a housing, a valve stem with actuator head, a resilient valve member, and a bias spring, said housing being an elongated hollow part formed from plastic material and defining a transverse wall between the ends of the housing, said transverse wall in part bounding two spaced open-ended chambers and the wall also having a central bore therethrough, said housing defining a discharge spout which communicates with a first of said two chambers, and a valve seat at the end of the portion of the housing bounding said first chamber; the valve stem being elongated and formed of plastic material and being slidably positioned in said bore and cooperating with the walls of said bore to serve as the means to inhibit leakage between the two chambers around the stem and through said bore, a head on one end of the valve stem being slidable in said second chamber of the housing; the bias spring being located in said second chamber of the housing in engagement with the transverse wall and the head of the valve stem; the resilient valve member having at least a portion thereof of greater dimension than the valve seat and being mounted on the other end of the stem and arranged to engage the valve seat on the housing; a first annular abutment bead defined on the exterior of the housing adjacent the valve-seat end of the housing, and a second annular abutment means defined on the housing and spaced from the annular bead and between the annular bead and the discharge spout, said first annular bead and said second annular abutment means being adapted to engage opposite surfaces of a bored wall through which the valve-seat end of the housing may be entered by a snap-fit.

3. A device as in claim 2 wherein the exterior wall of the housing between said first and second abutment means is tapered toward the valve-seat end of the housing.

4. A device as in claim 3 in combination with a container having a wall with a tapered bore therethrough for receiving in sealing engagement said exterior wall of the housing.

5. A disposable valved spout for snap-on attachment to a container for liquids, said valved spout consisting of four elements: a housing, a valve stem with actuator head, a resilient valve member, and a bias spring, said housing being an elongated hollow part formed from plastic material and defining a transverse wall between the ends of the housing, said transverse wall in part bounding two spaced open-ended chambers and the wall also having a central bore therethrough, said housing defining a discharge spout which communicates with a first of said two chambers, and a valve seat at the end of the portion of the housing bounding said first chamber; the valve stem being elongated and formed of plastic material and being slidably positioned in said bore and cooperating with the walls of said bore to serve as the means to inhibit leakage between the two chambers around the stem and through said bore, a head on one end of the valve stem being slidable in said second chamber of the housing; the bias spring being located in said second chamber of the housing in engagement with the transverse wall and the head of the valve stem; the resilient valve member having at least a portion thereof of greater dimension than the valve seat and being mounted on the other end of the stem and arranged to engage the valve seat on the housing; a first annular abutment bead defined on the exterior of the housing adjacent the valve-seat end of the housing, and a second annular abutment means defined on the housing and spaced from the annular bead and between the annular bead and the discharge spout, said first annular bead and said second annular abutment means being adapted to engage oposite surfaces of a bored wall through which the valve-seat end of the housing may be entered by a snap-fit, said second annular abutment means being constructed and arranged to index and position said valved spout for use, said second abutment means having a non-circular configuration that is complementary to the internal configuration of a recess portion in said bored wall of the container for facilitating entry and positioning of said disposable valved spout in said container.

6. In combination, a container for receiving a liquid comestible, said container being made from plastic and having a wall with a bore therein for receiving a disposable valved spout in snap-on engagement therewith, the portion of the wall adjacent said bore being recessed and being at least in part non-circular in cross section, and a disposable valved spout comprising a housing, a valve stem with an actuator head, a resilient valve member carried on said valve stem, and a bias spring, said housing being an elongated hollow part formed from plastic material, said valve stem being reciprocably slidable in said housing between a closed position wherein said valve member engages a valve seat on one end of said housing and an open position wherein said valve member is away from said valve seat, said bias spring normally urging said valve member to the closed position in engagement with said valve seat, a first annular abutment bead defined on the exterior of the housing adjacent the valve-seat end of the housing, and a second annular abutment means defined on the housing in spaced relationship from the annular bead, said first annular bead and said second annular abutment means being adapted to engage opposite surfaces of said bored wall of said container through which the valve-seat end of the housing may be entered by a snap-fit, said second annular abutment means having a non-circular external configuration complementary at least in part to the non-circular recessed wall portion, said non-circular complementary surfaces on said housing and said container indexing said housing with respect to said container and thereby facilitating entry and positioning of said disposable valved spout in said container.

7. A disposable valved spout as in claim 5 wherein the valve-receiving end of the valve stem is of reduced dimension with respect to the remainder of the valve stem so as to define a shoulder on the valve stem, said resilient valve member being carried on said valve-receiving end of said valve stem in abutting relationship to said shoulder.

References Cited by the Examiner
UNITED STATES PATENTS

| | | | |
|---|---|---|---|
| 630,184 | 8/1899 | Cooke | 251—322 |
| 2,628,062 | 2/1953 | Weber | 251—322 |
| 2,764,324 | 9/1956 | Landreth | 222—501 |
| 3,111,014 | 11/1963 | Herrick | 251—322 X |
| 3,139,219 | 6/1964 | Gran | 222—131 |

ROBERT R. REEVES, *Primary Examiner.*

F. R. HANDREN, *Assistant Examiner.*